(12) United States Patent
Omran et al.

(10) Patent No.: US 9,771,079 B2
(45) Date of Patent: Sep. 26, 2017

(54) SYSTEMS AND METHOD FOR CONTROL OF A POWER TAKE-OFF CLUTCH

(71) Applicant: CNH Industrial America LLC, New Holland, PA (US)

(72) Inventors: Ashraf Mohammed Kandeel Omran, Clarendon Hills, IL (US); Brian Allen Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/166,336

(22) Filed: May 27, 2016

(65) Prior Publication Data

US 2017/0197625 A1    Jul. 13, 2017

Related U.S. Application Data

(60) Provisional application No. 62/277,408, filed on Jan. 11, 2016.

(51) Int. Cl.
| | |
|---|---|
| *G06F 17/00* | (2006.01) |
| *B60W 30/188* | (2012.01) |
| *F16D 48/02* | (2006.01) |
| *B60K 25/06* | (2006.01) |

(52) U.S. Cl.
CPC ......... *B60W 30/1888* (2013.01); *B60K 25/06* (2013.01); *F16D 25/14* (2013.01); *B60W 2300/152* (2013.01); *B60W 2510/02* (2013.01); *B60W 2510/0666* (2013.01); *B60W 2710/02* (2013.01); *B60Y 2300/1888* (2013.01); *B60Y 2300/423* (2013.01); *F16D 2500/10437* (2013.01)

(58) Field of Classification Search
None
See application file for complete search history.

(56) References Cited

U.S. PATENT DOCUMENTS

| | | | |
|---|---|---|---|
| 4,344,499 A | 8/1982 | van der Lely et al. | |
| 4,597,301 A | 7/1986 | Weis et al. | |
| 4,760,902 A | 8/1988 | Bellanger | |
| (Continued) | | | |

FOREIGN PATENT DOCUMENTS

WO    2015184104 A1    12/2015

OTHER PUBLICATIONS

European Search Report for European Application No. 17150895.5 dated Jun. 19, 2017 (6 pages).

*Primary Examiner* — Dirk Wright
(74) *Attorney, Agent, or Firm* — Rickard K. DeMille; Rebecca L. Henkel

(57) ABSTRACT

A method includes measuring a parameter indicative of a measured torque in a PTO clutch, determining an incremental torque based at least in part on proportional-integral-derivative (PID) control logic, determining a command torque, wherein the command torque is a sum of the measured torque and the incremental torque, generating a control signal, wherein a current of the control signal corresponds to the command torque and a pressure in a cylinder of the PTO clutch, providing the control signal to the PTO clutch, reducing the incremental torque if an engagement power exceeds an engine power output, and ceasing engagement if an energy absorbed by the clutch exceeds an energy rating of the PTO clutch.

20 Claims, 8 Drawing Sheets

(56) References Cited

U.S. PATENT DOCUMENTS

| | | | | |
|---|---|---|---|---|
| 5,029,087 | A | * | 7/1991 | Cowan ................ F16H 61/143 192/3.3 |
| 5,121,820 | A | * | 6/1992 | Brown ................ F16H 61/143 192/103 F |
| 5,123,302 | A | * | 6/1992 | Brown ................ F16H 61/061 477/154 |
| 5,439,428 | A | * | 8/1995 | Slicker .................. F16D 48/06 192/103 R |
| 5,494,142 | A | | 2/1996 | Kale |
| 5,601,172 | A | | 2/1997 | Kale et al. |
| 5,630,773 | A | * | 5/1997 | Slicker ................ B60P 7/0807 477/175 |
| 6,092,021 | A | | 7/2000 | Ehlbeck et al. |
| 6,253,140 | B1 | | 6/2001 | Jain et al. |
| 6,267,189 | B1 | | 7/2001 | Nielsen et al. |
| 6,517,465 | B2 | | 2/2003 | Hrazdera |
| 7,234,366 | B2 | | 6/2007 | Hou |
| 7,377,103 | B2 | | 5/2008 | Yu et al. |
| 8,364,363 | B2 | | 1/2013 | Nakamura et al. |
| 8,606,476 | B2 | * | 12/2013 | Whitton ................ F16D 48/066 192/31 |
| 8,818,663 | B2 | * | 8/2014 | Thor .................... B60W 10/02 701/54 |
| 8,849,530 | B2 | * | 9/2014 | Thor .................... F16H 61/061 701/67 |
| 9,002,585 | B2 | | 4/2015 | Porter et al. |
| 9,079,493 | B2 | | 7/2015 | Pociask et al. |
| 2015/0045184 | A1 | | 2/2015 | Nishimoto |

* cited by examiner $Z_1$ : PRE-FILL
$Z_{21}$: GENTLY INCREMENT
$Z_{22}$: LOW ENERGY SHOCKING
$Z_3$ : MODULATION
$Z_4$ : RAMP
$Z_5$ LOCK UP

SYSTEMS AND METHOD FOR CONTROL OF A POWER TAKE-OFF CLUTCH

CROSS REFERENCE TO RELATED APPLICATIONS

This application claims priority from and the benefit of U.S. Provisional Patent Application No. 62/277,408, entitled "TRANSMISSION AND POWER TAKE-OFF SYSTEMS FOR AN OFF-ROAD VEHICLE," filed Jan. 11, 2016, which is hereby incorporated by reference in its entirety.

BACKGROUND

This disclosure relates generally to power take-offs (PTOs), and more specifically to controlling the clutch of a PTO.

Power take-offs are typically used in vehicles, such as tractors and trucks, to provide power from an engine of the vehicle to a machine (e.g., an agricultural implement) that may be attached to the vehicle or towed behind the vehicle. For example, in an agricultural application, a tractor may tow an implement (e.g., a tiller, a seeder, a harvester, etc.) over a field in order to perform an agricultural task. A PTO may be coupled to the engine of the vehicle (e.g., via a drive shaft) to provide power to the implement. The PTO may include a PTO clutch to couple and decouple a PTO shaft and the drive shaft. A time-based PTO clutch engagement modulation may result in the engine stalling if the power output of the engine is insufficient to complete the desired engagement. Similarly, if the energy absorbed by the PTO clutch during the desired engagement exceeds the energy rating of the PTO clutch, the lifespan of the clutch may be reduced.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a method includes measuring a parameter indicative of a measured torque in a PTO clutch, determining an incremental torque based at least in part on proportional-integral-derivative (PID) control logic, determining a command torque, wherein the command torque is a sum of the measured torque and the incremental torque, generating a control signal, wherein a current of the control signal corresponds to the command torque and a pressure in a cylinder of the PTO clutch, providing the control signal to the PTO clutch, reducing the incremental torque if an engagement power exceeds an engine power output, and ceasing engagement if an energy absorbed by the clutch exceeds an energy rating of the PTO clutch.

In a second embodiment, a non-transitory computer readable medium includes executable instructions that when executed cause a processor to determine an incremental torque based at least in part on proportional-integral-derivative (PID) control logic, determine a command torque, wherein the command torque is a sum of a current torque and the incremental torque, wherein the current torque is determined based on a measure parameter indicative of the current torque, generate a control signal, wherein the current of the control signal corresponds to the command torque and a pressure in a cylinder of the PTO clutch, provide the control signal to the PTO clutch, reduce the incremental torque if an engagement power approaches or exceeds an engine power output, and cease engagement if an energy absorbed by the clutch exceeds an energy rating of the PTO clutch.

In a third embodiment, a system includes a PTO clutch configured to couple and decouple a PTO shaft and a drive shaft and a controller. The PTO clutch includes a cylinder, a piston disposed within the cylinder, a valve fluidly coupled to the cylinder and configured to restrict or allow fluid flow between the cylinder and a fluid reservoir, and a solenoid coupled to the valve and configured to control a position of the valve. The controller is in communication with the solenoid, and is configured to receive a current torque in a PTO clutch, wherein the current torque is based on a measured parameter indicative of the current torque in the PTO clutch, determine an incremental torque based at least in part on PID control logic, determine a command torque, wherein the command torque is a sum of a current torque and the incremental torque, generate a control signal, wherein a current of the control signal corresponds to the command torque and a pressure in a cylinder of the PTO clutch, provide the control signal to the solenoid, reduce the incremental torque if an engagement power approaches or exceeds an engine power output, and cease engagement if an energy absorbed by the clutch exceeds an energy rating of the PTO clutch.

DRAWINGS

These and other features, aspects, and advantages of the present disclosure will become better understood when the following detailed description is read with reference to the accompanying drawings in which like characters represent like parts throughout the drawings, wherein.

Figure 11:
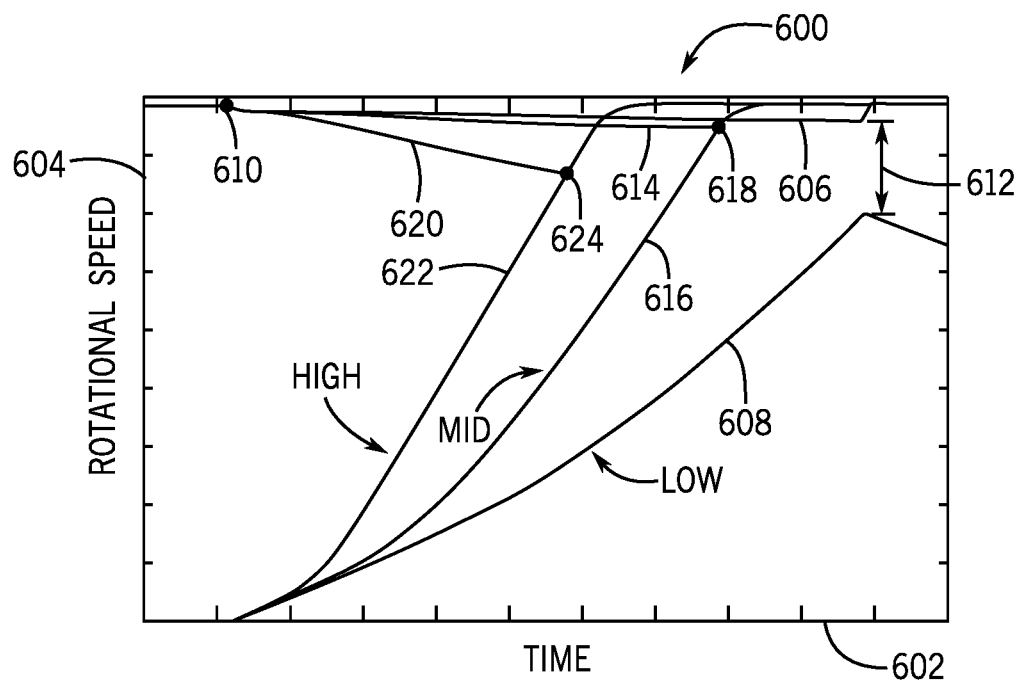
Figure 12:
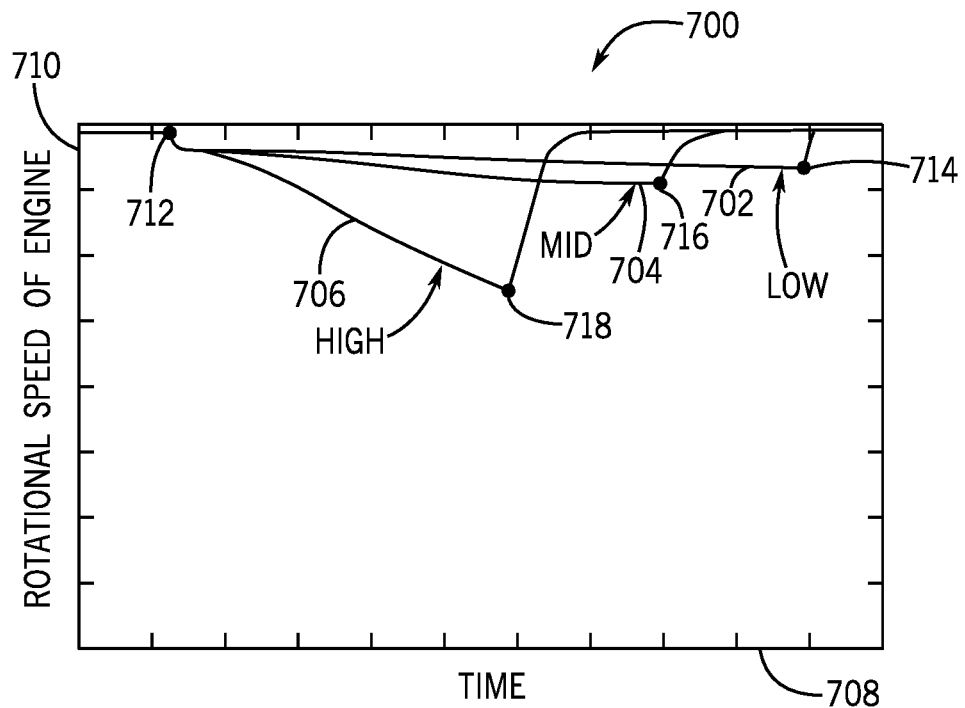

FIG. 11 is a graph of the rotational shaft speed before and after the PTO clutch during each of the low aggressive type engagement, the medium aggressive type engagement, and the high aggressive type engagement, in accordance with an embodiment; and FIG. 12 is a graph of the rotational speed of the engine over time during each of the low aggressive type engagement, the medium aggressive type engagement, and the high aggressive type engagement, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The presently disclosed embodiments include techniques for controlling a power take-off (PTO) clutch utilizing an incremental PID feedback control loop that considers a power output of an engine and an energy absorbed by the PTO clutch during engagement. Incremental PID control of the PTO clutch may reduce or eliminate engine stalls during engagement and may increase the life of the PTO clutch by maintaining the energy absorbed by the PTO clutch below an energy rating.

Figure 1:
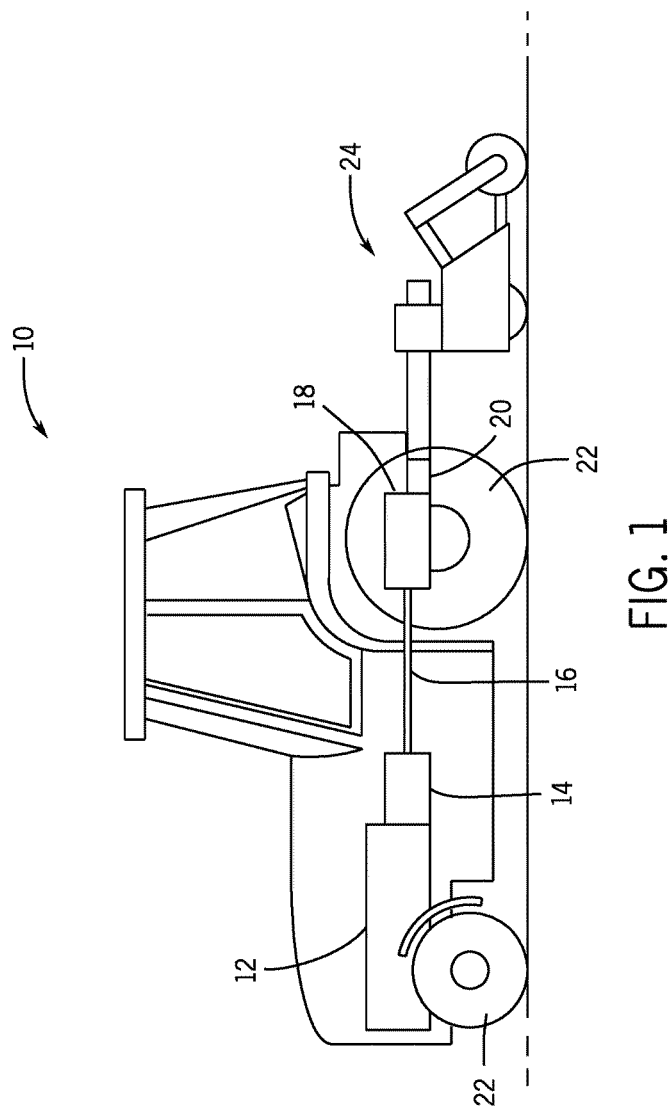
FIG. 1 is a schematic of a tractor, in accordance with an embodiment.

FIG. 1 is a diagram of an off-road vehicle (e.g., a tractor 10), including an engine 12, an engine transmission assembly 14, a drive shaft 16, a power takeoff (PTO) transmission assembly 18, and a PTO shaft 20, in accordance with an embodiment of the present disclosure. The engine transmission assembly 14 is coupled to the engine 12 to transfer power from the engine 12 to the drive shaft 16, which powers wheels 22 of the tractor 10. The PTO transmission assembly 18 is coupled to the engine 12 (e.g., via drive shaft 16) and the PTO shaft 20 such that the engine 12 drives the PTO shaft 20. As will be described below, the PTO transmission assembly may include a PTO clutch that is controlled according to an incremental PID feedback control loop. In some implementations, the tractor 10 may be an autonomous tractor, such that the tractor 10 may be driven without operator input or include automated control, but with an operator present (e.g., supervised autonomy). The tractor 10 may be coupled to an implement 24. The implement 24 may be a raker, tillage implement, mower, seeder, harvester, or any other implement. The implement 24 may be coupled to the PTO shaft 20 such that the PTO shaft 20 powers certain components on the implement 24.

Figure 2:
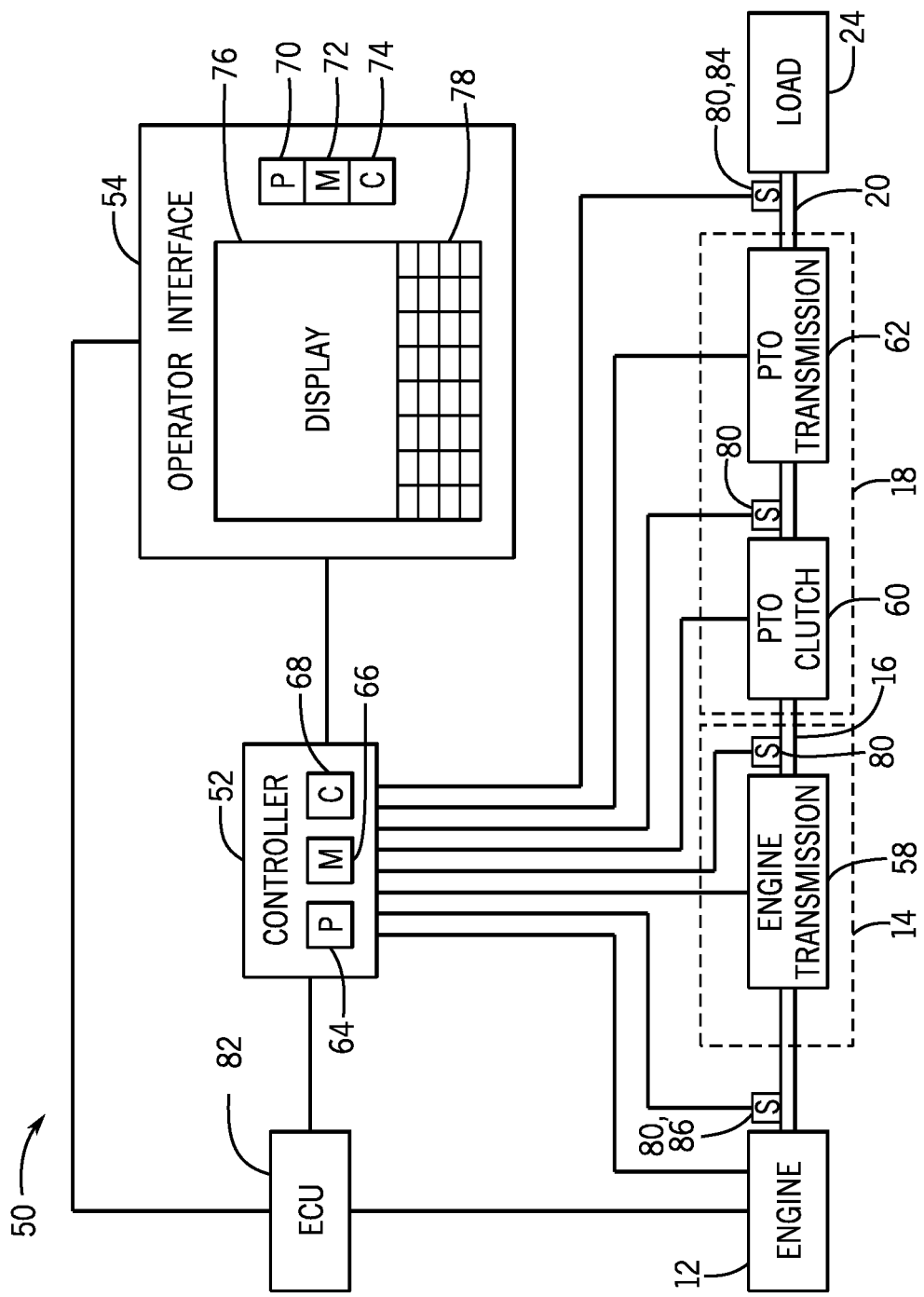
FIG. 2 is a schematic of a drive system of the tractor shown in FIG. 1, in accordance with an embodiment.

FIG. 2 is a schematic of one embodiment of a drive system 50 of the tractor 10 shown in FIG. 1. In the illustrated embodiment, the drive system 50 includes the engine 12, the engine transmission assembly 14, the drive shaft 16, the PTO transmission assembly 18, the PTO shaft 20, a controller 52, and an operator interface 54. Other embodiments of the drive system 50 may include different elements in alternative combinations.

The engine transmission assembly 14 may include an engine transmission 58. The PTO transmission assembly 18 may include a PTO clutch 60 and a PTO transmission 62. The PTO clutch 60 may be a push type clutch, a pull type clutch, a single plate clutch a multiple plate clutch, a wet clutch, a dry clutch, a centrifugal clutch, a belt clutch, a dog clutch, a hydraulic clutch, an electromagnetic clutch, or any other type of clutch. The PTO clutch 60 may be configured to engage and disengage in order to couple and decouple the PTO shaft 20 from the drive shaft 16 (and the engine 12). When the engine 12 is running, the drive shaft 16 is rotating, and the PTO transmission 62 and PTO shaft 20 are decoupled from the drive shaft 16, the PTO clutch 60 may be engaged to bring the PTO transmission 62 and PTO shaft 20 up to speed with the drive shaft 16. The PTO clutch 60 may then be locked up to couple the PTO transmission 62 and PTO shaft 20 to the engine 12, such that the engine 12 rotates the PTO shaft 20 (e.g., via the drive shaft 16). The PTO clutch 60 may be disengaged in order to enable the PTO shaft 20 to slow down, or so the PTO transmission 62 can change gears. As discussed below, the PTO clutch 60 may be controlled according to an incremental PID feedback control loop.

The PTO transmission 62 may be a geared transmission or a non-geared transmission, such as a continuously variable transmission. The gear may be selected manually by the user, or automatically via the controller 52. The PTO transmission 62 may have the same number of gears as the engine transmission 58, or a different number of gears. For example, the PTO transmission 62 may have a high gear and a low gear, selectable by the user (e.g., via the operator interface 54). In other embodiments, the PTO transmission 62 may have more than 2 gears. For example, the PTO transmission 62 may have 2, 3, 4, 5, 6, 7, 8, 9, 10, or any other number of gears.

The controller 52 may include an incremental proportional-integral-derivative (PID) controller for controlling the PTO clutch 60. The specific functionality of the controller 52 is described in more detail below. The controller 52 may include a processor 64, a memory component 66, and communication circuitry 68. The processor 64 may include one or more general-purpose processors, one or more application specific integrated circuits, one or more field programmable gate arrays, or the like. The memory 66 may be any tangible, non-transitory, computer readable medium that is capable of storing instructions executable by the processor 64 and/or data that may be processed by the processor 64. In other words, the memory 66 may include volatile memory, such as random access memory, or non-volatile memory, such as hard disk drives, read-only memory, optical disks, flash memory, and the like. The communication circuitry 68 may be configured to receive inputs (e.g., feedback signals, sensor signals, etc.) and transmit outputs (e.g., control signals, command signals, etc.) to the various components of the drive system 50.

The operator interface 54 may be disposed inside the tractor 10 (e.g., in a cab of the tractor 10) and be configured to display information for, and receive inputs from, the operator. In the illustrated embodiment, the operator interface 54 includes a processor 70, a memory component 72, communication circuitry 74, a display 76, and operator inputs 78. The processor 70 may include one or more general-purpose processors, one or more application specific integrated circuits, one or more field programmable gate arrays, or the like. The memory 72 may be any tangible, non-transitory, computer readable medium that is capable of storing instructions executable by the processor 70 and/or data that may be processed by the processor 70. The memory 72 may include volatile memory, such as random access memory, or non-volatile memory, such as hard disk drives, read-only memory, optical disks, flash memory, and the like. The communication circuitry 74 may be configured to communicate with the controller 52 (e.g., via the communication circuitry 68 of the controller 52). In some embodiments, the communication circuitry 68, 74 may communicate with various components in the drive system 50 wirelessly. In some embodiments, the operator interface 54 and the controller 52 may be disposed within the same housing, may share processors 64, 70, memory components 66, 72, and/or communication circuitry 68, 74. In further embodiments, the controller 52 and the operator interface 54 may be the same component. The operator interface 54 includes the display 76, which may be configured to display information related to the tractor 10 to the operator. The display 76 may be a screen, an array of LEDs, a series of gauges, a combination thereof, or some other arrangement. The operator interface 54 also includes an operator input 78 that enables a user to input information. The operator input 78 may be a keyboard, a series of buttons, a joystick, a mouse, a track pad, etc. In some embodiments, the display 76 and the operator input 78 may be a single component (e.g., a touchscreen).

Based on inputs received from the operator interface 54 and one or more sensors 80 disposed throughout the system 50, as well as inputs that may be stored in the memory component 56, the controller 52 may output a control signal to one or more of the components within the drive system 50. The drive system 50 has at least one speed sensor 80 to measure the rotational speed of the PTO shaft (e.g., PTO shaft speed sensor 84). In some embodiments, the drive system 50 may have a speed sensor 80 to determine the rotational speed of the engine 12 (e.g., engine speed sensor 86). In some embodiments, the engine 12 may have its own dedicated controller (e.g., ECU 82) that controls the operation of the engine 12. In such embodiments, the ECU 82 may be in communication with, or receive instructions from, the controller 52 and/or the operator interface 54. In some embodiments, the controller 52 may receive information (e.g., engine 12 speed) from the ECU 82 rather than the sensor 80. Accordingly, the ECU 82 may output the engine 12 speed to the controller 52. As shown in FIG. 2, the drive system 50 may include other speed sensors 80 disposed at various locations throughout the drive system 50.

Figure 3:
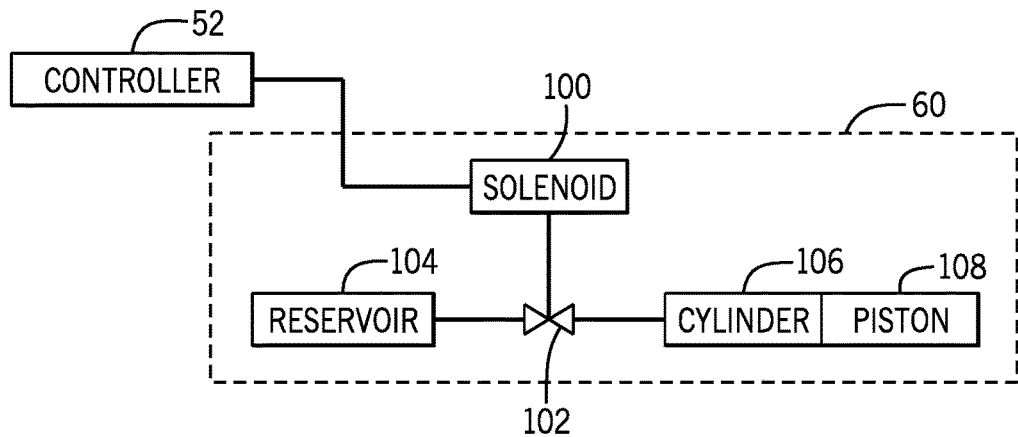
FIG. 3 is a schematic of an embodiment of the PTO clutch shown in FIG. 2.

FIG. 3 is a schematic of the PTO clutch 60. As previously discussed, the controller 52 may output a control signal to one or more of the components within the drive system 50. In the embodiment shown in FIG. 3, the controller 52 outputs a control signal (e.g., a current) to a solenoid 100 within the PTO clutch 60. It should be understood, however, that the use of the solenoid 100 to actuate control of the PTO clutch 60 is merely an example and that other configurations may be possible. The solenoid 100 may actuate a valve 102 between a fluid reservoir 104 and a cylinder 106. The cylinder 106 may include a piston 108, upon which the pressure in the cylinder 106 acts to actuate engagement of the PTO clutch 60. The current of the control signal output to the solenoid 100 may indicate the desired position of the valve 102 (open, closed, partially open, etc.) or commanded pressure in the cylinder 106. The pressure in the cylinder 106 may be indicative of clutch engagement.

PTO clutch 60 engagement is typically controlled using time-based engagement modulation. Time-based engagement modulation may be based on an acceleration of the PTO shaft 20 (shown in FIG. 1) and time. If the load of the implement 24 is too high, the time-based engagement modulation may cause the engine 12 speed (RPM) to drop excessively, or may generate more energy than the PTO clutch 60 is rated to absorb energy during the engagement. Accordingly, the controller 52 may utilize the incremental PID feedback control loop to control engagement of the PTO clutch 60 to limit an engine 12 power and an energy absorbed by the PTO clutch 60 during the engagement. Rather than using a time-based engagement modulation, the disclosed techniques consider engine 12 power and energy absorbed by the PTO clutch 60 during engagement in controlling the PTO clutch 60. Controlling PTO clutch 60 engagement using a closed loop incremental PID controller 52 that considers engine 12 power and energy absorbed by the PTO clutch 60 may reduce or eliminate engine 12 speed drop and reduce or eliminate instances in which the energy absorbed by the PTO clutch 60 exceeds the energy rating of the PTO clutch 60. For example, the controller 52 may be configured to cease engagement if the estimated energy absorbed by the PTO clutch 60 during the engagement exceeds the energy rating of the PTO clutch 60. The values of the incremental PID gains determine how quickly engagement occurs. The disclosed embodiments include three types of engagement: high aggressive, medium aggressive, and low aggressive. However, it should be understood, that embodiments with different numbers of aggressiveness types are also envisaged. For example, other embodiments may have 1, 2, 3, 4, 5, 6, 7, 8, 9, 10, or more aggressiveness types. In other embodiments, the various aggressiveness types may not be a series of discrete values, but a continuous spectrum of values.

Figure 4:
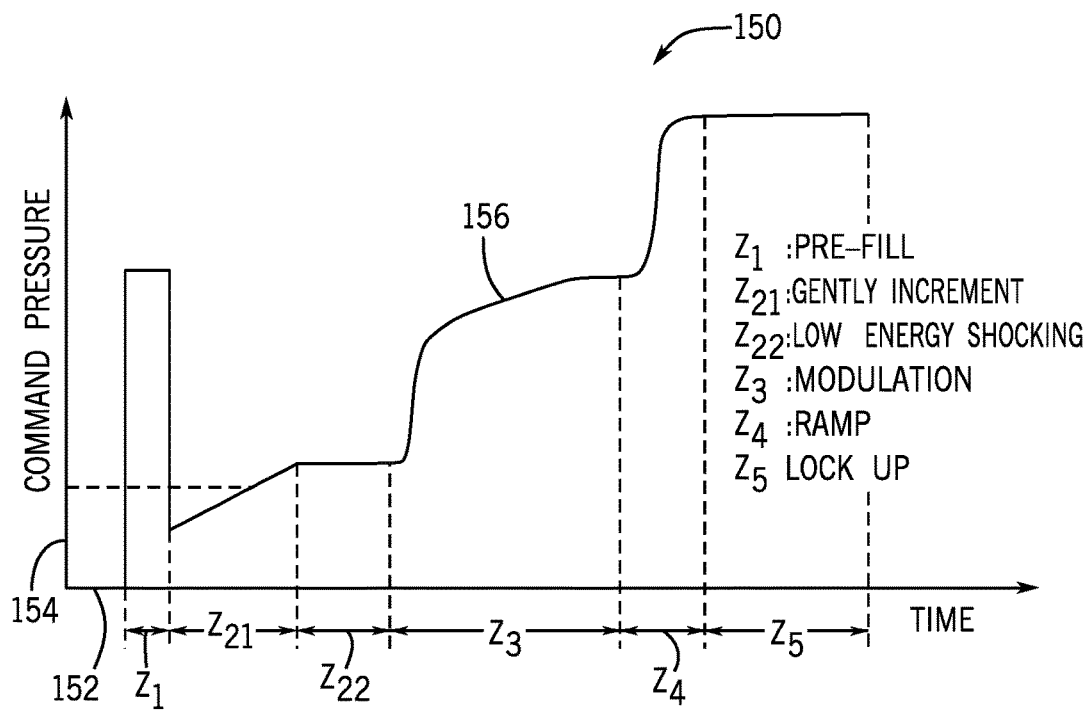
FIG. 4 is a graph of a commanded pressure in the PTO clutch cylinder of FIG. 3 during an engagement, in accordance with an embodiment.

The incremental PID control logic used by the controller 52 to control the PTO clutch 60 engagement in the tractor 10 has five modes, which will be described in more detail below: pre-fill, fill, modulation, ramp to steady, and locking up. The fill mode may include two submodes: gentle increment and low energy shocking. FIG. 4 is a graph 150 of one embodiment of the commanded pressure in the PTO clutch cylinder 106 (communicated via the control signal sent to the solenoid 100 discussed with regard to FIG. 3) versus time in each of the five modes. In graph 150, the x-axis 152 represents time and the y-axis 154 represents the commanded pressure in the cylinder 102, as commanded by the controller 52 via the control signal. Line 156 represents the commanded pressure in the cylinder 106 over time. The pre-fill mode is represented by $Z_1$, the fill mode is represented by $Z_{21}$ and $Z_{22}$ (the gentle increment submode and the low energy shocking submode, respectively), the modulation mode is represented by $Z_3$, the ramp mode is represented by $Z_4$, and the lock up mode is represented by $Z_5$.

If the PTO shaft 20 speed (e.g., after the PTO transmission 62) is detected (e.g., via the sensor 84) to be zero, the controller enters the pre-fill mode $Z_1$. If the PTO shaft 20 speed (e.g., after the PTO transmission 62) is detected (e.g., via the sensor 84) to be nonzero, the pre-fill mode is skipped and the controller 52 proceeds to the modulation mode $Z_3$.

In the pre-fill mode, indicated by $Z_1$ in FIG. 4, the control signal sent by the controller 52 to the solenoid 100 instructs the solenoid 100 to open the valve 102, allowing fluid (e.g., oil) to flow from the reservoir 104 to the cylinder 106, increasing the pressure in the cylinder 106. Fluid fills the PTO clutch cylinder 106 until the pressure in the cylinder 106 reaches the commanded pressure. Once the pressure in the cylinder 106 reaches the commanded pressure, the controller proceeds to fill mode, indicated by $Z_{21}$ and $Z_{22}$ in FIG. 4.

The fill mode, indicated by $Z_{21}$ and $Z_{22}$ in FIG. 4, begins with the gentle increment $Z_{21}$ submode followed by the low energy shock $Z_{22}$ submode, as shown in FIG. 4. In the gentle increment submode $Z_{21}$, the controller gradually (e.g., linearly) increases the pressure in the cylinder 106. In low energy shock mode $Z_{22}$, the controller continues to increase the pressure in the cylinder 106, but at a slower rate than in the gentle increment submode $Z_{21}$. If at any point during the fill mode, the controller 52 determines that the PTO shaft 20 speed is greater than zero, the controller 52 proceeds to the modulation mode $Z_3$.

In modulation mode, indicated by $Z_3$ in FIG. 4, the pressure in the cylinder is increased and the speed of the PTO shaft 20 are increased. When the PTO clutch 60 is fully locked up, the gear ratio across the PTO clutch 60 (e.g., the rotational speed of the shaft, in RPM, after the clutch divided by the rotational speed of the shaft, in RPM before the shaft) is zero. When the PTO clutch 60 is fully engaged, shaft before the PTO clutch 60 rotates at the same speed as the shaft after the PTO clutch 60. Accordingly, when the PTO clutch 60 is fully engaged, the gear ratio across the PTO clutch 60 (e.g., the rotational speed of the shaft, in RPM, after the clutch divided by the rotational speed of the shaft, in RPM before the shaft) is 1. During modulation mode, as the rotational speed of the PTO shaft 20 increases, the gear ratio across the PTO clutch 60 also increases. When the gear ratio across the PTO clutch 60 reaches a threshold value (e.g., 0.92), the controller 52 proceeds to the ramp mode. In the present embodiment, the threshold gear ratio is 0.92, however other values may be possible. For example, the threshold gear ratio may be 0.7, 0.75, 0.8, 0.85, 0.87, 0.89, 0.9, 0.91, 0.92, 0.93, 0.94, 0.95, 0.96, 0.97, 0.98, 0.99, or any other value. In the ramp mode, indicated by $Z_4$ in FIG. 4, the controller 52 utilizes an open loop to increase the control signal to the maximum current in a given period of time (e.g., 1 second). The modulation and ramp modes will be discussed in more detail below.

During engagement, the PTO clutch 60 applies a torque T to the load (e.g., the implement 24, via the PTO shaft 20) defined by:

$$T = \mu_{dyn} NPAR_{eq} \text{sgn}|\omega|, \quad (1)$$

where T is the torque applied from the PTO clutch 60 to the load 24 (e.g., via the PTO shaft 20), $\mu_{dyn}$ is the coefficient of kinetic friction, N is number of friction surfaces, P is the PTO clutch 60 cylinder 106 pressure, A is the engagement surface area, $\omega$ is the relative angular velocity or slip, and $R_{eq}$ is effective torque radius, which may be defined by:

$$R_{eq} = \frac{2}{3} \frac{R_0^3 - R_i^3}{R_0^2 - R_i^2}, \quad (2)$$

where $R_o$ and $R_i$ are the outer and inner radii, respectively, of each friction surface. The conversion from torque T to pressure P in the cylinder 106 is defined by:

$$P = \frac{T}{\mu_{dyn} NAR_{eq} \text{sgn}|\omega|}. \quad (3)$$

Figure 5:
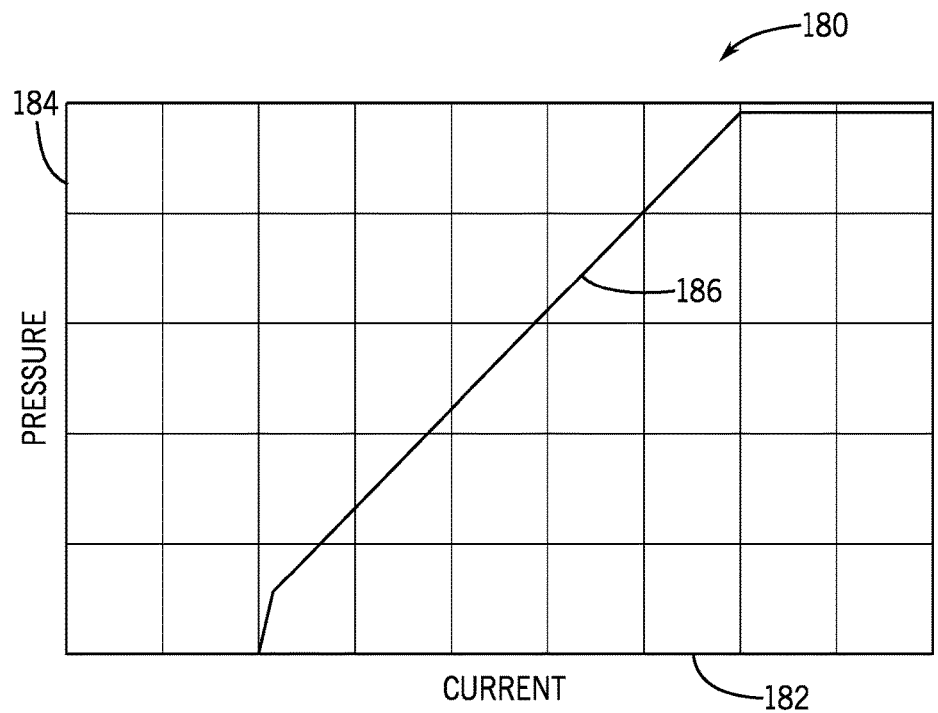
FIG. 5 is a graph of the relationship between the commanded pressure in the PTO clutch cylinder and the current of the control signal provided by the controller, in accordance with an embodiment.

Pressure may be converted to current using the graph shown in FIG. 5. FIG. 5 is a graph 180 of the relationship between the commanded pressure in the cylinder 106 and the current of the control signal provided by the controller 52. The x-axis 182 represents the current of the control signal from the controller 52. The y-axis 184 represents the commanded pressure in the cylinder 106. As previously discussed, the current is provided to the solenoid 100 via the control signal from the controller 52. The controller may provide the current that corresponds to the commanded cylinder 106 pressure. In some embodiments, the relationship between current and the commanded pressure illustrated in FIG. 5 may also be represented by a lookup table. The solenoid 100 operates the valve 102, which allows or restricts fluid (e.g., oil) flow between the reservoir 104 and the cylinder 106. The cylinder 106 may include the piston 108, which may actuate (e.g., engage or disengage) the PTO clutch 60. The pressure in the cylinder 106 acts on the piston 108, affecting the position of the piston 108 and the engagement of the PTO clutch 60.

The controller 52 may receive the PTO shaft 20 speed from the PTO shaft speed sensor 84, and the engine 12 speed from the engine speed sensor 86, or from the ECU 82. An instantaneous PTO clutch 80 gear ratio is calculated by dividing the shaft speed just after the PTO clutch 60 by the shaft speed just before the PTO clutch 60. The shaft speed just before the PTO clutch 60 may be determined by multiplying the engine 12 speed (e.g., as received from the ECU 82 or the engine speed sensor 86) by the commanded engine transmission 58 gear ratio. In some embodiments, there may be a sensor 80 (shown in FIG. 2) to measure the speed of the drive shaft 16. The shaft speed just after the PTO clutch 60 may be determined by multiplying the PTO shaft 20 speed (e.g., as received from PTO shaft speed sensor 84) by the commanded PTO transmission 62 gear ratio. In some embodiments, the shaft speed before and after the PTO clutch 60 may be determined in other ways based upon available sensors 80 disposed throughout the system and other known values within the drive system 50 (e.g., commanded gear ratios, engine 12 speed, etc.). Accordingly, the gear ratio across the PTO clutch 60 may be determined by dividing the calculated shaft speed just after the PTO clutch 60 by the calculated shaft speed just before the PTO clutch. In other embodiments, the instantaneous clutch gear ratio may be determined by taking a ratio of engine speed to PTO shaft speed. Using the shaft speed just before the PTO clutch 60 and the shaft speed just after the PTO clutch 60, the PTO clutch 60 gear ratio may be determined. The PTO clutch 60 gear ratio ranges between 0 (no engagement) and 1 (fully engaged).

In the modulation mode $Z_3$, the controller 52 increments the torque T using PID control law. A PID controller continuously calculates an error value as the difference between the measured process variable and a desired setpoint. The presently disclosed controller 52 is an incremental PID controller in that PID control law is used to determine a torque increment based on a measured or determined torque $T_k$ (e.g., based on a parameter indicative of the torque, for example shaft speed, shaft acceleration, cylinder pressure, etc.). The commanded torque $T_{k+1}$ is the sum of the current (e.g., measured) torque $T_k$ and the calculated torque increment. In the instant embodiment, the commanded torque $T_{k+1}$ may be defined by:

$$T_{k+1} = T_k + \text{PID}(n_{gear}), \qquad (4)$$

where $T_{k+1}$ is the commanded torque (e.g., at the point k+1), $T_k$ is the measured torque at the point k, and $\text{PID}(n_{gear})$ is the torque increment, where PID indicates the PID control logic, and $n_{gear}$ is the gear ratio across the PTO clutch. Point k may be the time of measurement, and point k+1 may be the point of the next measurement, the next clock cycle, or a point in time after the controller has taken action (e.g., at least one iteration). The aggressiveness of the engagement (e.g., high aggressive, medium aggressive, low aggressive) will be considered in the PID coefficients of the controller 52, where more aggressiveness may result in higher gains.

In some embodiments, a limitation may be placed on commanded torque $T_{k+1}$ according to the maximum available power from the engine 12 and the energy rating of the PTO clutch 60. Additionally, to control how much power is transferred from the engine 12 to the PTO clutch 60, a maximum acceleration or maximum velocity rating may be considered. For example, in a highly aggressive type engagement, the engagement duration may be 2 seconds. For a medium aggressive type engagement, the engagement duration may be 1.5 seconds. For low aggressive type engagement, the engagement duration may be 1 second. In other embodiments, the engagement duration for a high aggressive type engagement, a medium aggressive type engagement, or a low aggressive type engagement may be 0.1 seconds, 0.2 second, 0.3 seconds, 0.4 seconds, 0.5 seconds, 0.7 seconds, 1 second, 1.25 seconds, 1.5 seconds, 1.75 seconds, 2 seconds, 2.5 seconds, 3 seconds, 3.5 seconds, 4.0 seconds, 4.5 seconds, 5 seconds, or any other value. However, it should be understood that these values are merely exemplary and that other values are possible.

Figure 6:
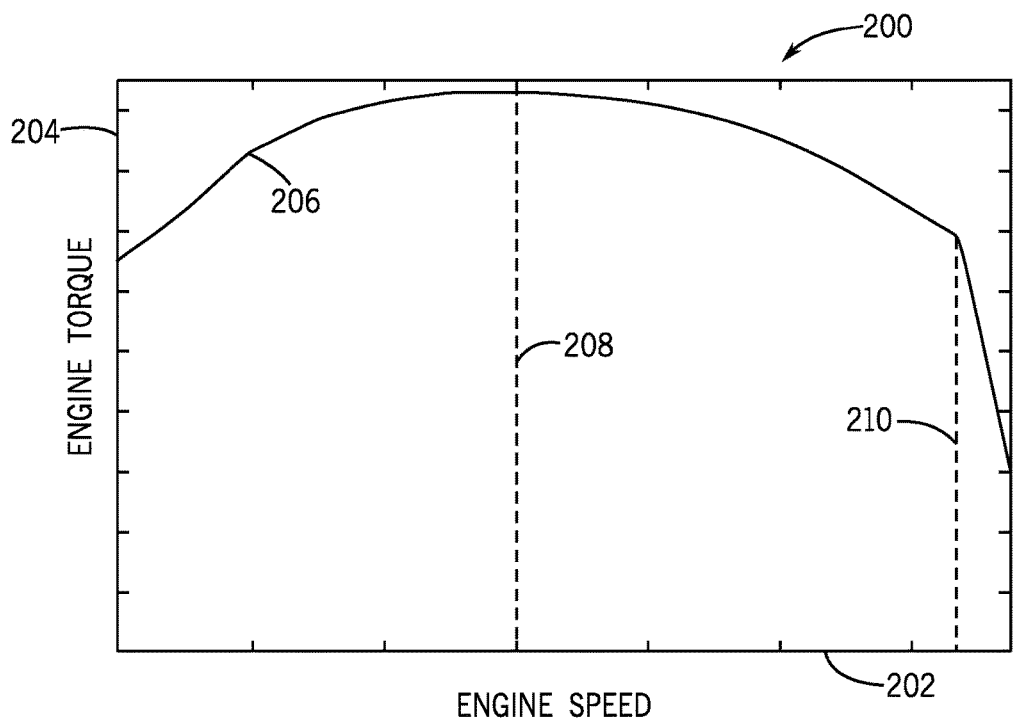
FIG. 6 is a graph of engine torque versus rotational speed of the engine, in accordance with an embodiment.

The engine 12 speed may also be considered during PTO clutch 60 engagement. FIG. 6 is a graph 200 of engine 12 torque versus the rotational speed of the engine 12. The x-axis represents the rotational speed of the engine 12. The y-axis represents the engine 12 torque. If the engine 12 is rotating at a speed between a first speed (e.g., line 208 about 1500 RPM) or more, the engine 12 is considered stable because an increase in the engine's 12 load will reduce the engine's 12 rotational speed, but the engine 12 will likely recover. If the engine 12 is rotating between the first speed (e.g., line 208 about 1500 RPM) and a second speed (e.g., line 210 about 2100 RPM), reducing the rotational speed of the engine 12 may increase the available torque of the engine 12. In this case, the engine 12 will likely recover to balance the load. Because the engine 12 can recover, the controller does not limit the commanded torque, as it is within the engine's 12 power.

If the engine 12 is spinning at a speed below the first speed (e.g., line 208 about 1500 RPM), the engine 12 is considered unstable because an increase in the engine load will reduce the engine speed, and the engine 12 will be unlikely to recover. If the engine 12 is spinning below the first speed (e.g., line 208 about 1500 RPM), reducing the rotational speed of the engine 12 may lead to a reduction of the available engine 12 torque. Reduction of available engine speed and torque may stall the engine 12 (e.g., make the engine stop rotating). In order to avoid stalling the engine 12, a PTO incremental PID controller 52 limitation on commanded torque may be determined using a lookup table or a graph (similar to the graph 200 shown in FIG. 6). The lookup table or graph may provide a maximum torque rating as a function of the engine 12 RPM. This limitation may reduce or eliminate engine 12 stall during PTO engagement with high load.

Figure 7:
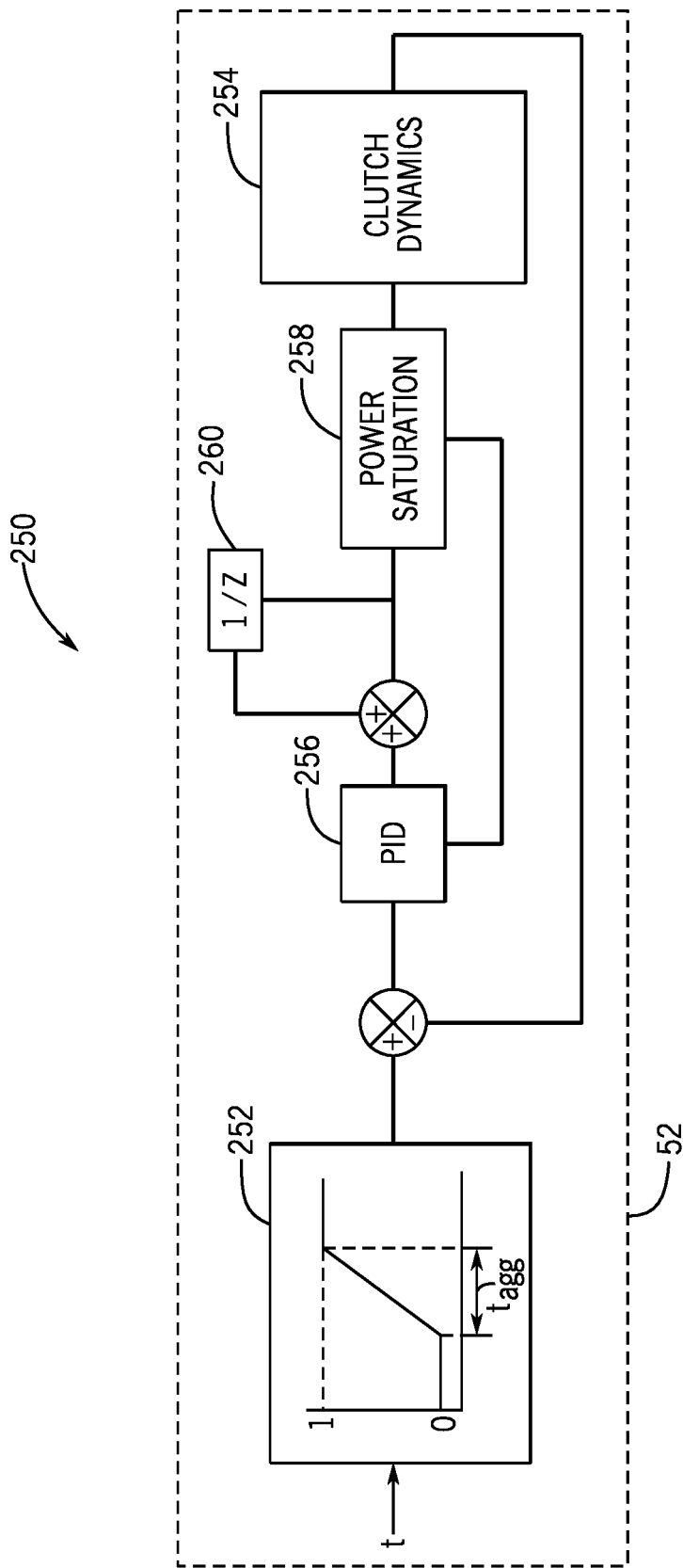
FIG. 7 is a block diagram of an embodiment of an incremental PID controller.

FIG. 7 is a block diagram 250 of one embodiment of the disclosed incremental PID controller 52. The gear ratio is zero when there is no engagement, the drive shaft 16 is rotating, and the PTO shaft 20 is not rotating. The target normalized gear ratio across the PTO clutch 60 for full engagement is 1. The gear ratio across the PTO clutch 60 may be determined by the controller 52 as a function of the commanded gear ratio as time t ranges from zero to $t_{agg}$, where $t_{agg}$, is the time of engagement. This is illustrated by block 252 of FIG. 7. For the highly aggressive type engagement, the value $t_{agg}$ may be 2 seconds. For medium aggressive type engagement, the value $t_{agg}$ may be 1.5 seconds. For low aggressive type engagement, the value $t_{agg}$ may be 1 second.

PTO clutch 60 dynamics (e.g., the rotational speed of the shaft before and/or after the clutch) may be determined in block 254. The PTO clutch 60 dynamics are combined with the time of engagement $t_{agg}$ and input to the PID controller (block 256). The power saturation (e.g., the power output of the engine 12 as a ratio of the power rating of the clutch) may be determined in block 258 and fed back to the PID controller (block 256).

Based on the inputs, the PID controller (block 256) may determine energy absorbed by the PTO clutch 60 by integrating power dissipation, defined by:

$$E = \int_0^t \text{Power} \, dt = \int_0^t T\omega \, dt. \qquad (5)$$

If the energy absorbed by the PTO clutch 60 is more than the maximum energy rating of the clutch, the PTO controller 52 may stop providing current, terminate the engagement, and generate an error. This will be discussed in more detail below, with regard to FIGS. 9-12.

The PID controller (block 256) outputs an incremental torque ($\text{PID}(n_{gear})$), which may be added to the current measured or determined torque $T_k$, or parameter indicative of torque (block 260), to generate the commanded torque $T_{k+1}$, as discussed above with regard to Equation 4. The commanded torque $T_{k+1}$ may correspond to a commanded pressure in the cylinder 106 and/or a current of the command signal. Using an equation or a look-up table, the controller 52 may determine the current of the control signal to the solenoid 100 to achieve the commanded cylinder 106 pressure. Accordingly, the controller 52 may output the calculated current to the solenoid 100 as part of the control signal.

The controller 52 may also include a maximum engagement time, after which the attempted engagement is ceased and an error is generated if there is no engagement. For example, in some embodiments, the maximum engagement time $t_{lockup}$ may be set at 15 seconds. In other embodiments, $t_{lockup}$ may be 5 seconds, 10 seconds, 20 seconds, 25 seconds, 30 seconds, or any other time period. If time t reaches 15 seconds and there is no engagement, the attempted engagement is ceased and an error is generated. In other embodiments, the maximum engagement time $t_{lockup}$ may be set at 5, 6, 7, 8, 9, 10, 11, 12, 13, 14, 15, 16, 17, 18, 19, 20, 21, 22, 23, 24, 25, 26, 27, 28, 29, or 30 seconds, or any other desired time. Once the normalized gear ratio reaches the set threshold value (e.g., 0.92 out of 1) in a time period of less than the maximum engagement time (e.g., t<15 seconds) for a threshold period of time (e.g., at least 0.1 seconds), the controller 52 proceeds to the ramp mode. Though in the present embodiment, the threshold time period is 0.1 seconds, in other embodiments, the threshold time period could be set at 0.01 seconds, 0.05 seconds, 0.2 seconds, 0.3 seconds, 0.5 seconds, 0.6 seconds, or any other value. The ramp mode $Z_4$ utilizes an open loop to increase the PTO clutch 60 to the maximum torque, maximum current, and/or maximum cylinder 106 pressure in 1 second, for example. However, the ramp mode time period may be 0.5 seconds, 0.75 seconds, 1.25 seconds, 1.5 seconds, 1.75 seconds, 2 seconds, 2.5 seconds, 3 seconds, 4 seconds, or any other value.

Once the maximum torque or maximum current has been reached, or the ramp mode time period (e.g., 1 second) passes, the controller proceeds to the disengage mode and disengages the clutch. In the disengage mode, the controller reduces the current to zero, the clutch is disengaged, and the PTO shaft 20 is coupled to, and driven by, the engine 12. If at any point during operation, the command from the controller 52 is to disconnect the load 24, the controller 52 also proceeds to disengage mode. Upon locking up of the PTO clutch, the PTO shaft 20 will be driven by the engine 12.

Figure 8:
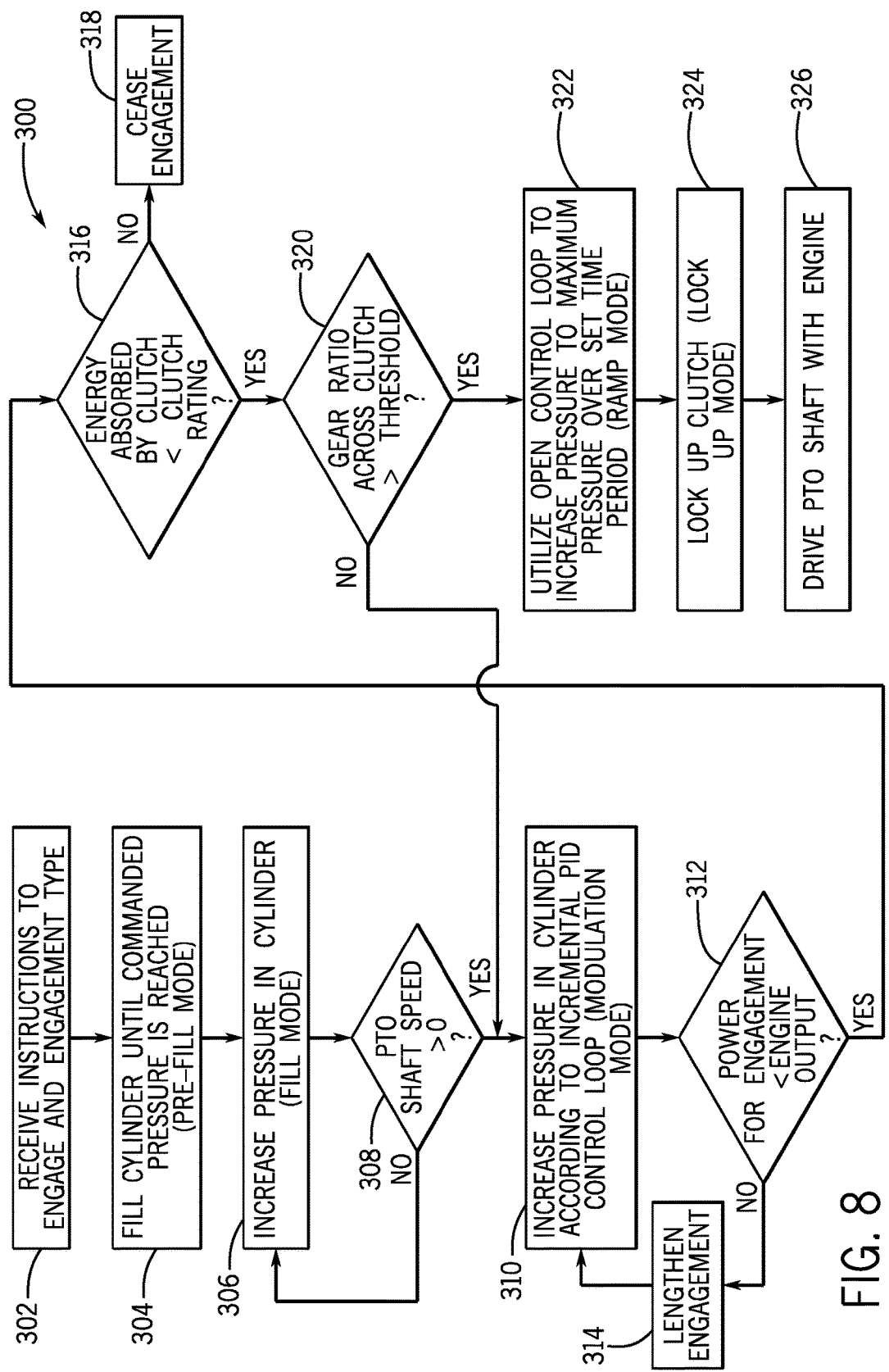
FIG. 8 is a flow chart of an embodiment of a process for controlling PTO engagement, in accordance with an embodiment.

FIG. 8 is a flow chart of an embodiment of a process 300 for controlling PTO clutch 60 engagement. The process 300 may be stored in a non-transitory computer readable medium such as the memory component 66, (e.g., in the form of code) and executable by the processor 64. In block 302, the instructions are received to engage the PTO clutch 60. In some embodiments, the instructions may also include information regarding the type of engagement (e.g., high aggressive, medium aggressive, or low aggressive type engagement). In some embodiments, the instructions may come from the operator of the tractor 10 (e.g., via the operator interface 54 or a PTO gear selection interface). In other embodiments, the instructions may be from the controller 52.

In block 304, the cylinder 106 is filled until the commanded cylinder pressure is reached. In some embodiments, the controller 52 sends a control signal to the solenoid 100, which operates the valve 102, allowing fluid flow between the reservoir 104 and the cylinder 106. The pressure in the cylinder 106 may act on the piston 108, which actuates the PTO clutch 60. Though the present embodiments include PTO clutch 60 actuation via the solenoid 100 and the valve 102, other techniques of PTO clutch 60 actuation may be utilized. This mode of operation may be referred to as pre-fill mode.

In block 306, the pressure in the cylinder 106 is gradually increased. This mode may be referred to generally as fill mode. Fill mode may include two submodes: the gentle increment submode and the low energy shock submode. In the gentle increment submode, the pressure in the cylinder 106 is gradually (e.g., linearly) increased. In low energy shock mode, the pressure in the cylinder 106 continues to increase, but at a slower rate than in the gentle increment submode. During the fill mode, the PTO shaft 20 speed may be monitored. If the PTO shaft 20 speed is zero, near zero, or below a threshold value (decision 308), pressure in the cylinder 106 continues to increase in fill mode (block 306). If the PTO shaft 20 speed is above zero, or above a threshold value, the process 300 proceeds to block 310.

In block 310, the pressure in the cylinder 106 is increased according to the incremental PID control loop. This mode of operation may be referred to as modulation mode. The incremental PID control loop was shown and described with regard to FIG. 7. As previously discussed, PID control logic is used to determine a torque increment, which is added to the measured torque $T_k$ (or determined from a measured parameter indicative or torque, such as shaft speed, shaft acceleration, cylinder pressure, etc.) to determine a commanded torque $T_{k+1}$. The aggressiveness of the engagement (e.g., high aggressive, medium aggressive, low aggressive) is considered in the PID coefficients of the feedback loop, where more aggressiveness may result in higher gains.

In some embodiments, a limitation may be placed on commanded torque $T_{k+1}$ according to the maximum available power from the engine 12 and the maximum energy rating of the PTO clutch 60. In some embodiments, the maximum commanded torque may be based on the power output of the engine. In other embodiments, the maximum commanded torque may be based on the energy rating of the PTO clutch 60. Additionally, to control how much power is transferred from the engine 12 to the PTO clutch 60, a maximum PTO shaft 20 acceleration or maximum PTO shaft 20 velocity rating may be considered.

At decision 312, the power for PTO clutch 60 engagement is compared to the power output of the engine 12. If the power for engagement is greater than the engine 12 output, then the time of engagement is lengthened (block 314) and the process 300 returns to block 310. If the power for engagement does not exceed the power output of the engine 12, the process 300 proceeds to decision 316.

At block 316, the energy absorbed by the PTO clutch 60 is compared to the maximum energy rating of the PTO clutch 60. If the energy absorbed by the PTO clutch 60 during engagement exceeds the energy rating of the PTO clutch 60, engagement is ceased (block 318). This will be discussed in more detail with regard to FIGS. 9-12. If the energy absorbed by the PTO clutch 60 does not exceed the energy rating of the PTO clutch 60, the process 300 proceeds to decision 320.

At decision 320, the gear ratio across the PTO clutch 60 is calculated and compared to a threshold value. The gear ratio across the clutch may be normalized such that it ranges from zero (no engagement) to 1 (full engagement). In the present embodiment, the threshold value is about 0.92. However, other values may be possible. If the gear ratio across the PTO clutch 60 is less than the threshold value, the process 300 returns to block 310 and stays in modulation mode. If the gear ratio across the PTO clutch 60 is greater than the threshold value (e.g., 0.92) for a over a threshold period of time (e.g., 0.1 second), the process 300 proceeds to block 322.

In block 322, the controller 52 utilizes an open loop to increase the control signal to the maximum current (which corresponds to the maximum pressure in the cylinder 106) in a given period of time (e.g., 1 second). This may be referred to as ramp mode (block 326).

In block 324, the clutch is locked up. This may be referred to as lock up mode. Following lock up mode, the PTO shaft 20 is driven by the engine 12.

Figure 9:
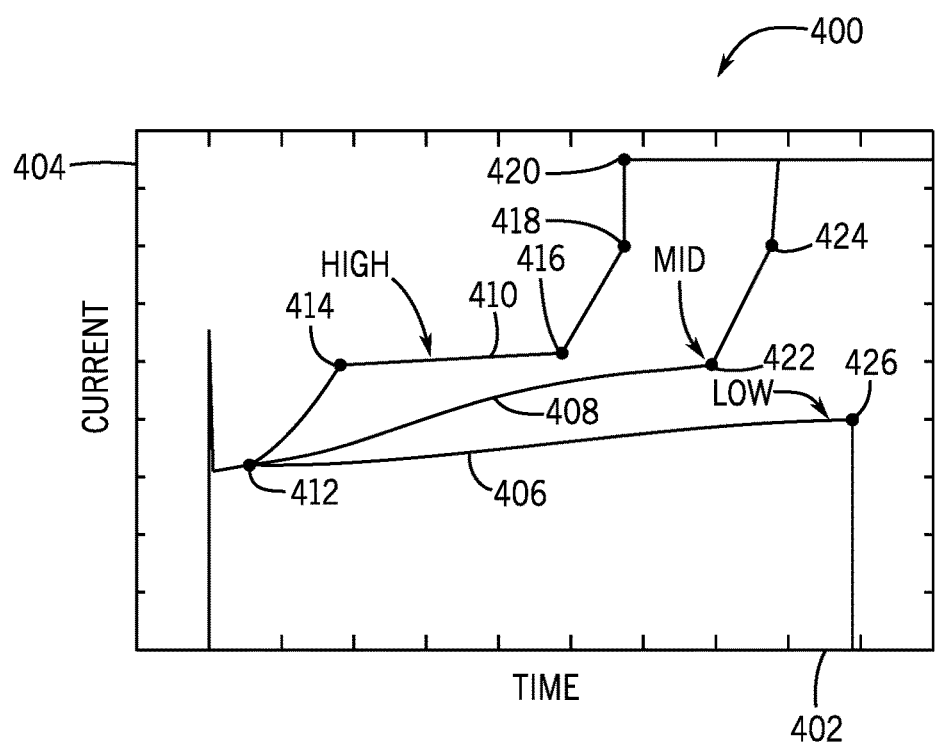
FIG. 9 is a graph of a control signal current for a low aggressive engagement, a medium aggressive engagement, and a high aggressive engagement, in accordance with an embodiment.

FIGS. 9-12 are various graphs illustrating three attempted engagements, each utilizing one of the three different aggressiveness types (e.g., low, medium, and high). FIG. 9 is a graph 400 of control signal current for a low aggressive engagement, a medium aggressive engagement, and a high aggressive engagement. The x-axis 402 represents time. The y-axis 404 represents the current of the control signal output by the controller 52. Line 406 is the current of the control signal output by the controller 52 in the low aggressive engagement. Line 408 is the current of the control signal output by the controller 52 in the medium aggressive engagement. Line 410 is the current of the control signal output by the controller 52 in the high aggressive engagement. As previously discussed, the aggressiveness type (e.g., low, medium, or high) is factored into the incremental PID control logic. The currents of the three control signals 406, 408, 410 are the same or similar in the pre-fill mode $Z_1$, as the current steps up and the pressure in the cylinder is increased. As discussed above with regard to FIGS. 4 and 5, the current of the control signal corresponds to a commanded cylinder 106 pressure. The currents of the control signals 406, 408, 410 continue to track one another through the fill mode $Z_2$, which includes the gentle increment $Z_{21}$ submode and the low energy shocking $Z_{22}$ submode. As discussed with regard to FIG. 4, during fill mode $Z_2$, the commanded cylinder 106 pressure, which is indicated by the current of the control signal, gradually increases. In the modulation mode $Z_3$, beginning at point 412, the three control signals 406, 408, 410 diverge from one another.

For example, for the high aggressive type engagement control signal 410, the current increases between points 412 and 414. At point 414, the rate at which the current of the high aggressive type engagement control signal 410 increases slows down. This may be for a variety of reasons. For example, the rotational speed of the engine 12 may drop, causing the controller (which applies the incremental PID feedback control loop illustrated and discussed with regard to FIG. 7) to reduce the incremental torque or stop incrementing all together in order to extend the engagement time. Between points 414 and 416, the current of the high aggressive type engagement control signal 410 continues to increase, but at a much slower rate than it did between points 412 and 414. In some embodiments, the current of the control signal may be entirely flat (e.g., incremental torque is zero) for a period of time during engagement. Between points 416 and 418, the current of the high aggressive type engagement control signal 410 ramps up again. This may be because the engine 12 has recovered and the rotational speed of the engine has increased, or for some other reason. At point 418, the current of the high aggressive type engagement control signal 410 transitions from the modulation mode $Z_3$ to the ramp mode $Z_4$ and increases to a maximum current (point 420) over a given period of time.

For the medium aggressive type engagement control signal 408, the current gradually increases between points 412 and 422 over a longer period of time than in the high aggressive type engagement 410. At point 422, the current increases at a faster rate than before. At point 424, the current of the medium aggressive type engagement control signal 408 transitions from the modulation mode $Z_3$ to the ramp mode $Z_4$ and increases to a maximum current over a given period of time.

For the low aggressive type engagement control signal 406, the current gradually increases between points 412 and 426 over a longer period of time than in the high aggressive type engagement 410 or the medium aggressive type engagement 408. At point 426, the current falls to zero, indicating the controller 25 has ceased the engagement attempt. In this specific case, the engagement attempt was ceased because the energy absorbed by the PTO clutch 60 approached or exceeded the maximum energy rating of the PTO clutch 60. When the engagement attempt is ceased, the current of the control signal goes to zero and an error message may be generated and displayed to the operator (e.g., via the operator interface 54).

Figure 10:
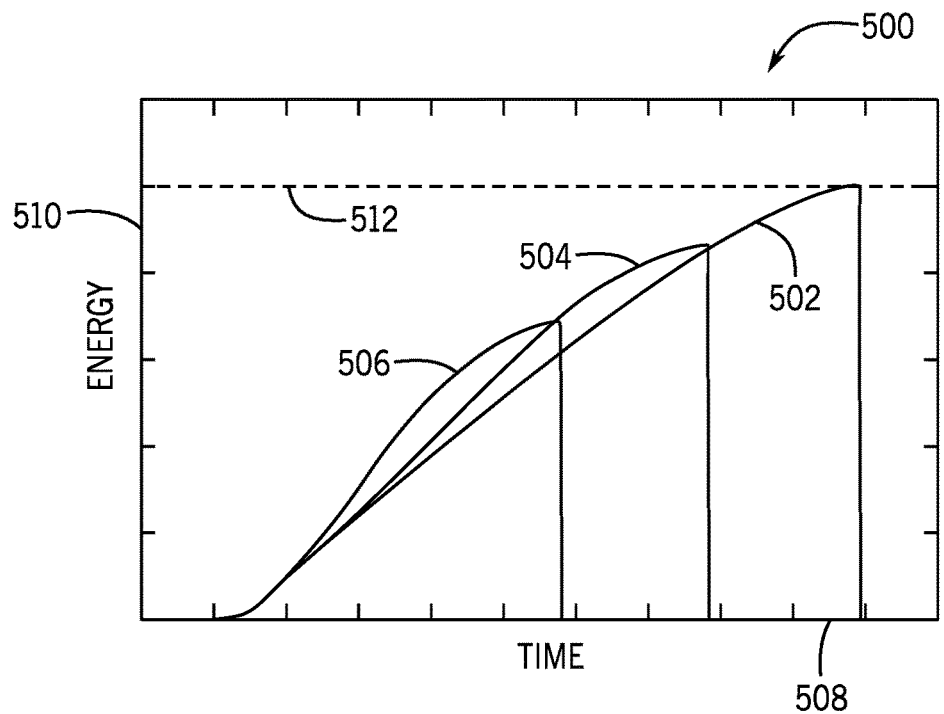
FIG. 10 is a graph of energy absorbed by the PTO clutch during the low aggressive type engagement, the medium aggressive type engagement, and the high aggressive type engagement, in accordance with an embodiment.

FIG. 10 is a graph 500 of the energy absorbed by the PTO clutch 60 during the low aggressive type engagement (line 502), the medium aggressive type engagement (line 504), and the high aggressive type engagement (line 506). The x-axis 508 represents time. The y-axis 510 represents energy absorbed by the PTO clutch 60. Line 512 represents the maximum energy rating of the PTO clutch 60. As previously discussed, the medium aggressive type engagement 504 and the high aggressive type engagement 504 are completed without reaching the energy rating 512 of the PTO clutch 60. However, in the instant case, the low aggressive type engagement 502 reaches the maximum energy rating 512 of the PTO clutch 60 before the engagement is completed. As discussed above with regard to FIG. 9, upon reaching the maximum energy rating 512 of the PTO clutch 60, the controller 52 ceases engagement and the current of the control signal falls to zero.

FIG. 11 is a graph of the rotational shaft speed before and after the PTO clutch 60 during each of the low aggressive type engagement, the medium aggressive type engagement, and the high aggressive type engagement. In the graph 600, the x-axis 602 represents time and the y-axis 604 represents rotational speed. Line 606 represents the rotational speed of the shaft before the PTO clutch 60, which in some embodiments may correspond to the rotational speed of the drive shaft 16, for the low aggressive type engagement. Line 608 represents the shaft speed after the PTO clutch 60 for the low aggressive type engagement. At point 610, as engagement begins, the rotational speed 606 of the shaft before the PTO clutch 60 begins to fall. Over the course of the engagement attempt, the rotational speed 606 of the shaft before the PTO clutch 60 falls steadily as the rotational speed 608 of the shaft after the PTO clutch 60 rises steadily. As discussed with regard to FIGS. 9 and 10, in this particular case, the energy absorbed by the PTO clutch 60 exceeded the maximum energy rating of the PTO clutch 60 and the engagement attempted was ceased. The ceased engagement is evidenced in graph by the gap 612 between the rotational shaft speed 606 before the PTO clutch 60 and the rotational shaft speed 608 after the PTO clutch. The gap 612 indicates that the attempted engagement was ceased before the rotational shaft speed 608 after the PTO clutch 60 could be brought up to match the rotational shaft speed 606 after the PTO clutch 60.

Line 614 represents the rotational speed of the shaft before the PTO clutch 60 for the medium aggressive type engagement. Line 616 represents the shaft speed after the PTO clutch 60 for the medium aggressive type engagement. At point 610, as engagement begins, the rotational speed 606 of the shaft before the PTO clutch 60 begins to fall. Over the course of the engagement attempt, the rotational speed 614 of the shaft before the PTO clutch 60 falls steadily as the rotational speed 616 of the shaft after the PTO clutch 60 rises steadily. Because the engagement type is a medium aggressive type engagement, the rotational speed 614 of the shaft before the PTO clutch 60 falls at a faster rate than in the low aggressive type engagement. Similarly, because the engagement type is a medium aggressive type engagement, the rotational speed 616 of the shaft after the PTO clutch 60 rises at a faster rate than in the low aggressive type engagement. At point 618, the rotational speed 616 of the shaft after the PTO clutch 60 matches the rotational speed 614 of the shaft before the PTO clutch 60. The rotational speed 616 of the shaft after the PTO clutch 60 and the rotational speed 614 of the shaft before the PTO clutch 60 then increase together as the engine 12 recovers. The medium aggressive type engagement is completed and the controller proceeds to the lock up mode $z_5$.

Line 620 represents the rotational speed of the shaft before the PTO clutch 60 for the high aggressive type engagement. Line 622 represents the shaft speed after the PTO clutch 60 for the high aggressive type engagement. At point 610, as engagement begins, the rotational speed 606 of the shaft before the PTO clutch 60 begins to fall. Over the course of the engagement attempt, the rotational speed 614 of the shaft before the PTO clutch 60 falls steadily as the rotational speed 616 of the shaft after the PTO clutch 60 rises steadily. Because the engagement type is a high aggressive type engagement, the rotational speed 620 of the shaft before the PTO clutch 60 falls at a faster rate than in the low aggressive type engagement or the medium type engagement. Similarly, because the engagement type is a high aggressive type engagement, the rotational speed 622 of the shaft after the PTO clutch 60 rises at a faster rate than in the low aggressive type engagement or the medium type engagement. At point 624, the rotational speed 622 of the shaft after the PTO clutch 60 matches the rotational speed 620 of the shaft before the PTO clutch 60. Because the engagement type is a high aggressive type engagement, point 624 occurs at an earlier time, but a lower rotational speed than the corresponding point 618 for the medium type engagement. The rotational speed 622 of the shaft after the PTO clutch 60 and the rotational speed 620 of the shaft before the PTO clutch 60 then increase together as the engine 12 recovers. The high aggressive type engagement is completed and the controller proceeds to the lock up mode $Z_5$.

FIG. 12 is a graph of the rotational speed of the engine 12 over time during each of the low aggressive type engagement (line 702), the medium aggressive type engagement (line 704), and the high aggressive type engagement (line 706). The x-axis represents time and the y-axis 710 represents the rotational speed of the engine 12. The rotational speed of the engine 12 may correspond to the rotational speed of the drive shaft 16. Specifically, when the engine 12 is driving the drive shaft 16, the rotational speed of the drive shaft 16 may be determined by multiplying the rotational speed of the engine 12 by the gear ratio of the engine transmission 58. As with the rotational shaft speeds 606, 614, 620 before the PTO clutch discussed with regard to FIG. 11 above, at point 712, the rotational speed of the engine 12 falls steadily for low, medium, and high aggressive engagements. For the low aggressive engagement 702, the engine speed falls gradually to point 714, at which point the engagement is ceased because the energy absorbed by the PTO clutch 60 exceeded the energy rating of the PTO clutch 60.

For the medium aggressive engagement 704, the rotational speed of the engine 12 falls at a faster rate than in the low aggressive engagement 702. At point 716, the rotational shaft speed after the PTO clutch 60 matches the rotational shaft speed before the PTO clutch 60. The engine 12 recovers as the rotational shaft speed after the PTO clutch 60 and the rotational shaft speed 614 before the PTO clutch 60 then increase together. The medium aggressive type engagement is completed and the controller proceeds to the lock up mode $Z_5$.

For the high aggressive engagement 706, the rotational speed of the engine 12 falls at a faster rate than in either the low aggressive engagement 702 or the medium aggressive engagement 704. At point 718, which occurs at an earlier time and lower rotational speed than point 716, the rotational shaft speed after the PTO clutch 60 matches the rotational shaft speed before the PTO clutch 60. The engine 12 recovers as the rotational shaft speed after the PTO clutch 60 and the rotational shaft speed 614 before the PTO clutch 60 then increase together. The high aggressive type engagement is completed and the controller 52 proceeds to the lock up mode $Z_5$.

The disclosed techniques include control of a PTO clutch 60 during engagement utilizing an incremental PID feedback control loop 250. The incremental PID feedback control loop 250 uses PID control logic to determine an incremental torque. The sum of the incremental torque and the measured or determined torque equal the commanded torque. The incremental PID feedback control loop 250 may consider the power output of the engine 12 and the energy absorption rating of the PTO clutch when determining the incremental toque. When determining the incremental torque, the incremental PID feedback control loop 250 may also consider one of multiple different aggressiveness types, wherein the aggressiveness type of the engagement corresponds to the elapsed time during engagement. Incremental PID control of the PTO clutch 60 may reduce or eliminate engine 12 stalls during engagement and may increase the life of the PTO clutch 60 by maintaining the energy absorbed by the PTO clutch 60 below an energy rating.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method, comprising:
    measuring a parameter indicative of a measured torque in a PTO clutch;
    determining an incremental torque based at least in part on proportional-integral-derivative (PID) control logic;
    determining a command torque, wherein the command torque is a sum of the measured torque and the incremental torque;
    generating a control signal, wherein a current of the control signal corresponds to the command torque and a pressure in a cylinder of the PTO clutch;
    providing the control signal to the PTO clutch;
    reducing the incremental torque if an engagement power exceeds an engine power output; and
    ceasing engagement if an energy absorbed by the clutch exceeds an energy rating of the PTO clutch.

2. The method of claim 1, wherein the incremental torque is also based on a desired engagement aggressiveness type.

3. The method of claim 2, wherein the engagement aggressiveness type comprises a high aggressive engagement type, a medium aggressive engagement type, and a low aggressive engagement type.

4. The method of claim 2, wherein the engagement aggressiveness type, is based, at least in part, on the elapsed time during engagement.

5. The method of claim 1, comprising operating an actuator to control the pressure in the cylinder based at least in part on the control signal.

6. The method of claim 5, wherein the actuator comprises a solenoid coupled to a valve.

7. The method of claim 1, comprising:
    determining a gear ratio across the PTO clutch;
    increasing the current of the control signal over a given period of time once the gear ratio across the PTO clutch reaches a threshold value.

8. The method of claim 1, wherein the engine is disposed within an agricultural vehicle.

9. A non-transitory computer readable medium comprising executable instructions that when executed cause a processor to:
    determine an incremental torque based at least in part on proportional-integral-derivative (PID) control logic;
    determine a command torque, wherein the command torque is a sum of a current torque and the incremental torque, wherein the current torque is determined based on a measure parameter indicative of the current torque;

generate a control signal, wherein the current of the control signal corresponds to the command torque and a pressure in a cylinder of the PTO clutch;

provide the control signal to the PTO clutch;

reduce the incremental torque if an engagement power exceeds an engine power output; and cease engagement if an energy absorbed by the clutch exceeds an energy rating of the PTO clutch.

10. The non-transitory computer readable medium of claim 9, wherein the incremental torque is also based on a desired engagement aggressiveness type.

11. The non-transitory computer readable medium of claim 10, wherein the engagement aggressiveness type comprises a high aggressive engagement type, a medium aggressive engagement type, and a low aggressive engagement type.

12. The non-transitory computer readable medium of claim 10, wherein the engagement aggressiveness type, is based, at least in part, on the elapsed time during engagement.

13. The non-transitory computer readable medium of claim 9, wherein the control signal provides instructions to an actuator to control the pressure in the cylinder based at least in part on the control signal.

14. The non-transitory computer readable medium of claim 9, wherein the non-transitory computer readable medium is disposed within an agricultural vehicle.

15. A system, comprising:

a PTO clutch configured to couple and decouple a PTO shaft and a drive shaft, wherein the PTO clutch comprises:

a cylinder;

a piston disposed within the cylinder;

a valve fluidly coupled to the cylinder and configured to restrict or allow fluid flow between the cylinder and a fluid reservoir; and a solenoid coupled to the valve and configured to control a position of the valve;

a controller in communication with the solenoid, wherein the controller is configured to:

receive a current torque in a PTO clutch, wherein the current torque is based on a measured parameter indicative of the current torque in the PTO clutch;

determine an incremental torque based at least in part on PID control logic;

determine a command torque, wherein the command torque is a sum of a current torque and the incremental torque;

generate a control signal, wherein a current of the control signal corresponds to the command torque and a pressure in a cylinder of the PTO clutch;

provide the control signal to the solenoid;

reduce the incremental torque if an engagement power exceeds an engine power output; and cease engagement if an energy absorbed by the clutch exceeds an energy rating of the PTO clutch.

16. The system of claim 15, wherein the incremental torque is also based on a desired engagement aggressiveness type.

17. The system of claim 16, wherein the engagement aggressiveness type comprises a high aggressive engagement type, a medium aggressive engagement type, and a low aggressive engagement type.

18. The system of claim 16, wherein the engagement aggressiveness type, is based, at least in part, on the elapsed time during engagement.

19. The system of claim 15, wherein the engine is disposed within an agricultural vehicle.

20. The system of claim 15, wherein the PTO shaft powers and agricultural implement.

* * * * *